July 2, 1968  G. W. WHITESIDES  3,391,038
METHOD OF MAKING INTERNALLY BRACED
STRUCTURAL WALL PANELS
Filed Feb. 21, 1964  4 Sheets-Sheet 1
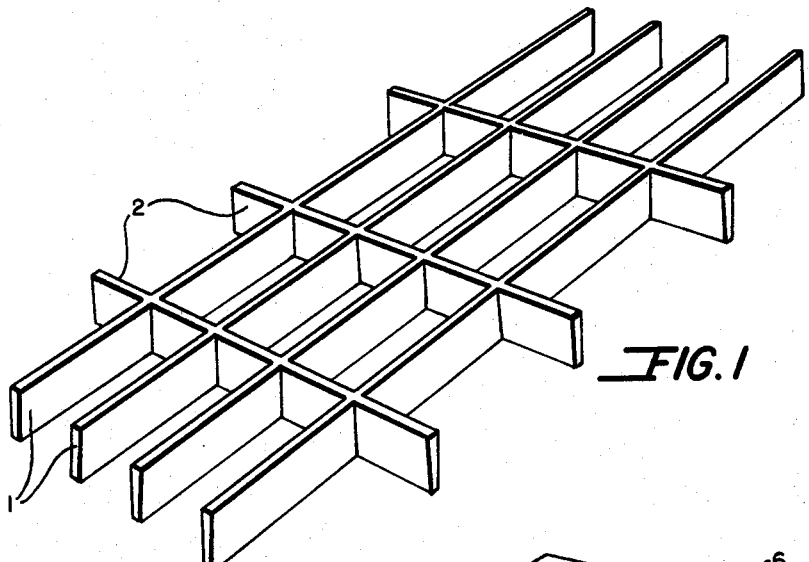
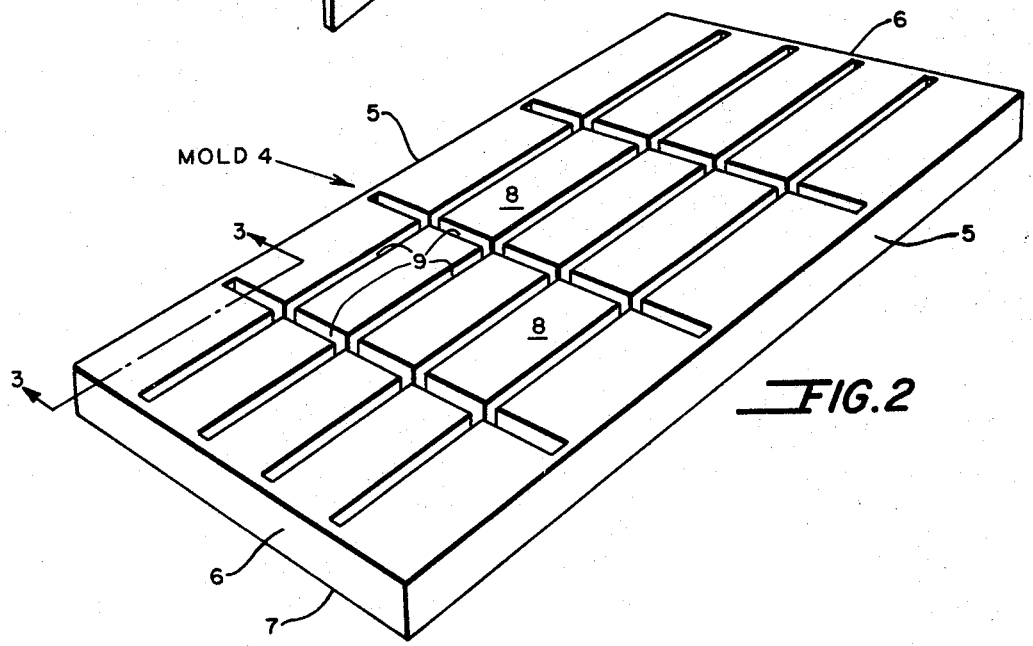
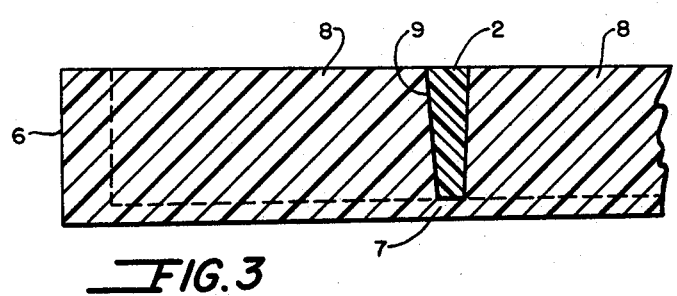
INVENTOR.
GEORGE W. WHITESIDES
BY
ATTORNEY July 2, 1968  G. W. WHITESIDES  3,391,038
METHOD OF MAKING INTERNALLY BRACED
STRUCTURAL WALL PANELS
Filed Feb. 21, 1964  4 Sheets-Sheet 2
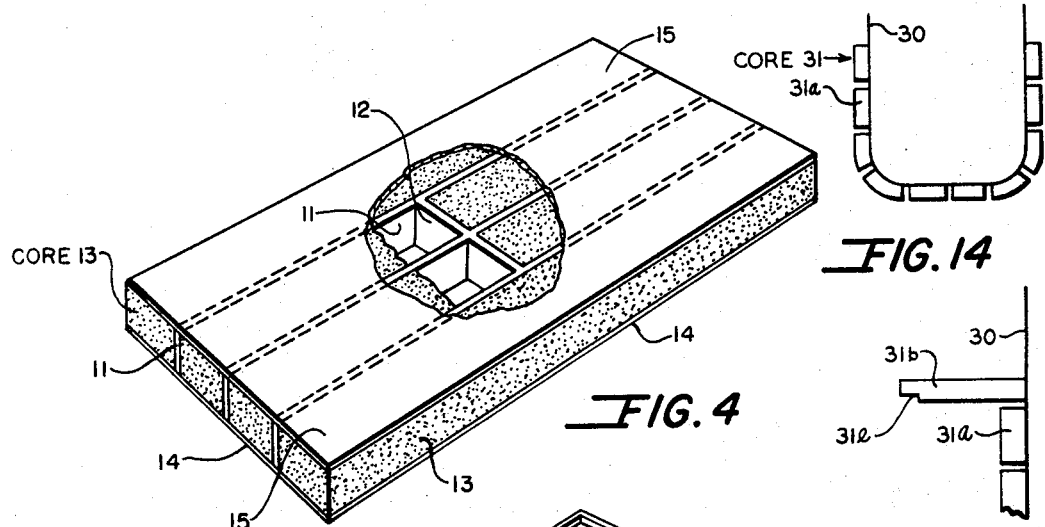
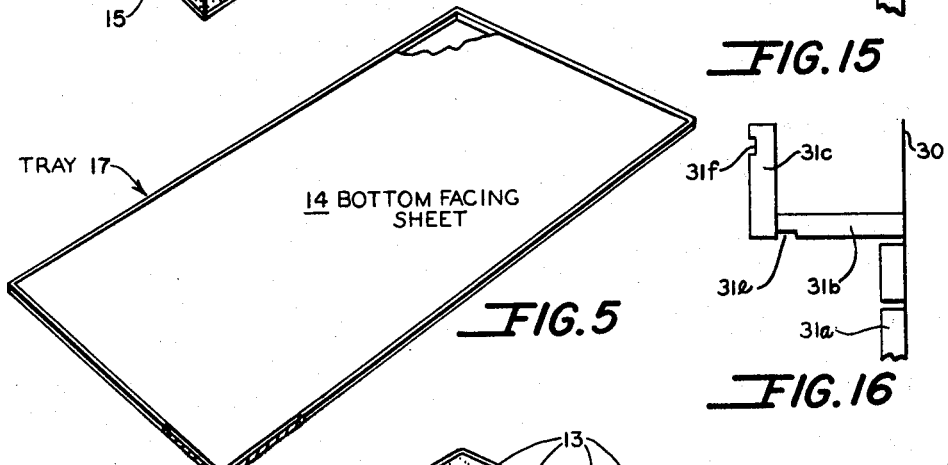
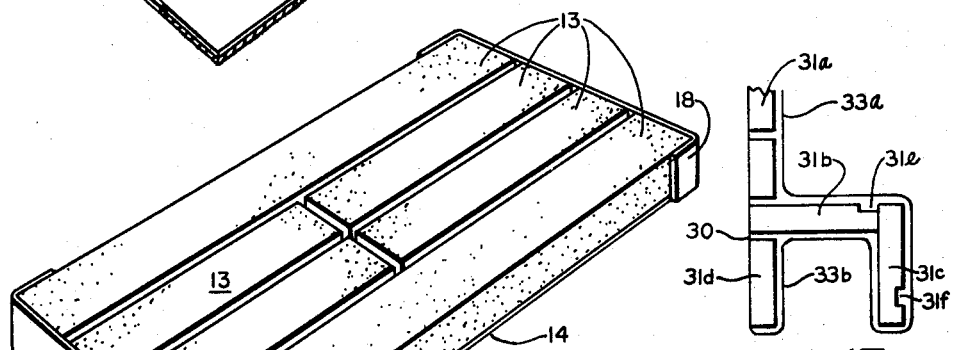
INVENTOR.
GEORGE W. WHITESIDES
BY
Arthur H. Robert
ATTORNEY July 2, 1968  G. W. WHITESIDES  3,391,038
METHOD OF MAKING INTERNALLY BRACED
STRUCTURAL WALL PANELS
Filed Feb. 21, 1964  4 Sheets-Sheet 3

INVENTOR.
GEORGE W. WHITESIDES
BY Arthur Robert
ATTORNEY

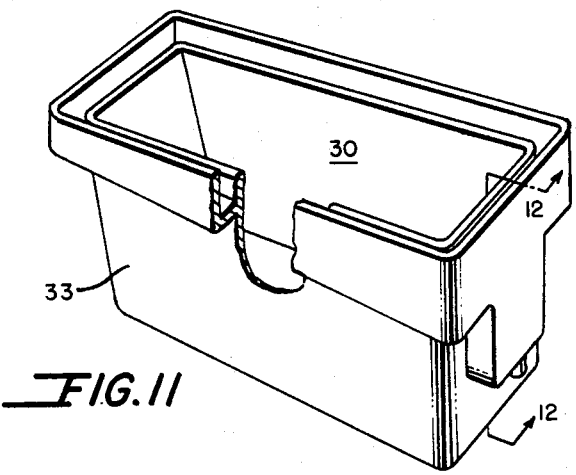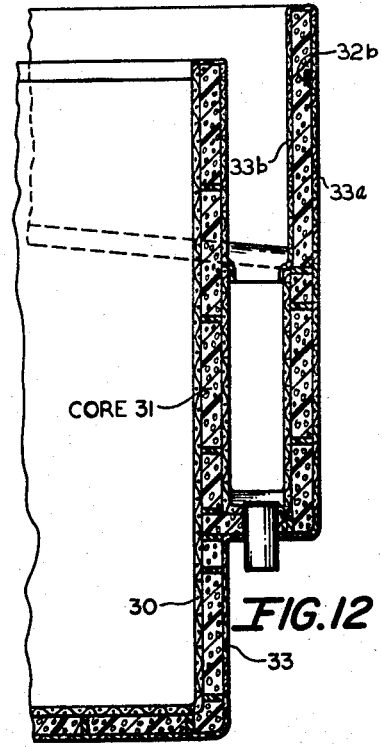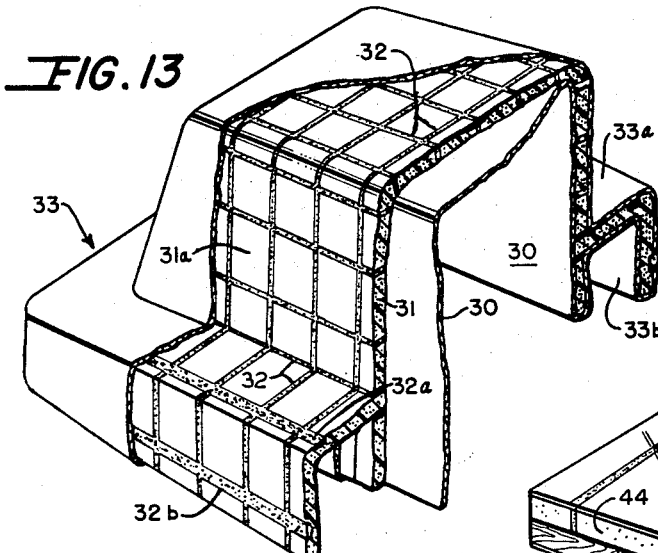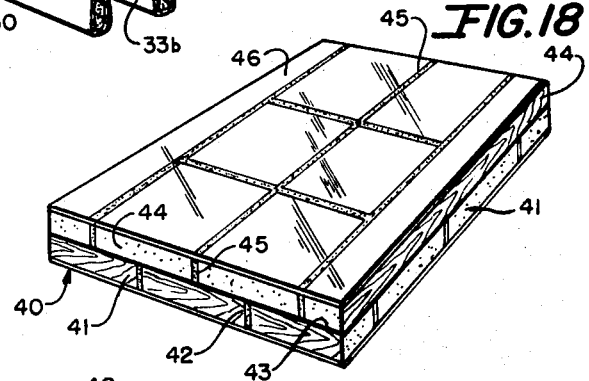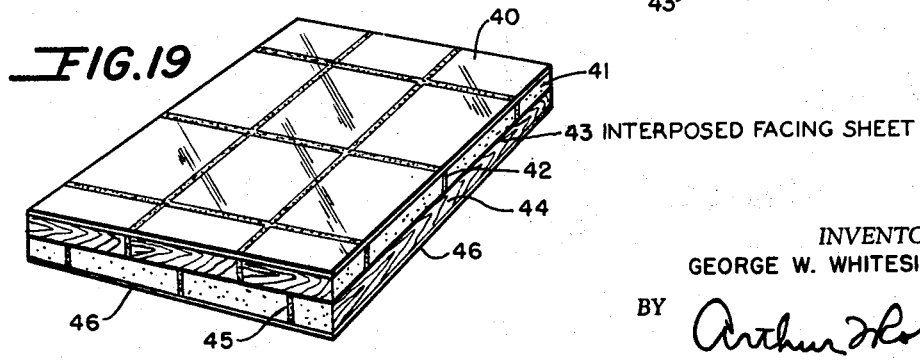

United States Patent Office 3,391,038
Patented July 2, 1968

3,391,038
METHOD OF MAKING INTERNALLY BRACED STRUCTURAL WALL PANELS
George W. Whitesides, 1011 Glenbrook Road, Anchorage, Ky. 40223
Filed Feb. 21, 1964, Ser. No. 346,557
12 Claims. (Cl. 156—78)

ABSTRACT OF THE DISCLOSURE

A structural load-bearing system of firm solid resinous ribs, arranged in a pattern of selected character, is formed (1) by pouring or extruding, into a corresponding pattern of rib-defining grooves of a core, a flowable plastic resinous material of a type which is hardenable into a unitary structurally strong hard solid mass, and (2) by hardening that resinous material to form the ribs. The pattern and resinous composition of the ribs depend on the known physical properties the final rib or rib-reinforced product must possess to meet the requirements of its intended use. The grooves may be formed in various temporary or permanent cores including meltable cores of wax, gelatin, etc., which may be removed from the rib product, and lightweight cores of foamed plastic, corrugated paper, balsa wood, etc., which may remain with the ribs in the final rib-reinforced product. The ribs may be bonded to one facing sheet (composed of metal, wood, plastic or other material) or sandwiched between and bonded to a pair of such facing sheets to form internally reinforced flat or curved panel-like structural products such as flat wall panels, trough-forming walls and pipe-forming walls.

---

Figure 7:
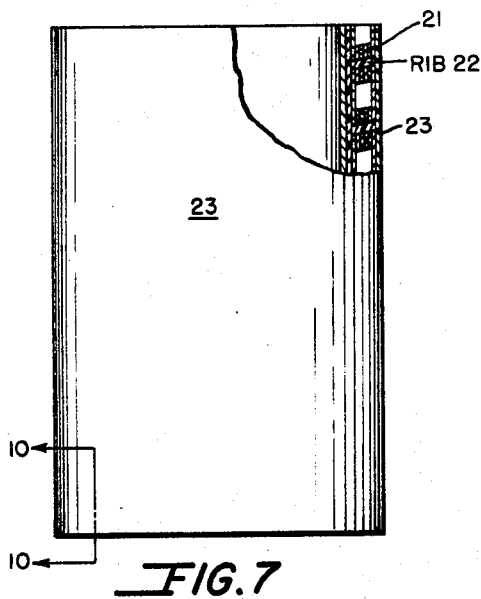

This invention principally relates to internally braced structural wall panels. While internally braced structural wall panels are usually made in flat planar form for use as wall panels, roof panels, doors and like structures, the present invention embraces shaped panels of simple and compound curvatures.

Structural wall panels are usually composed of core material faced with structural sheet material. This core material, often lightweight, may take the form of balsa wood, foam plastic, prefabricated metal honeycombs or other "cellular" material. It is generally faced with plastic sheets, plywood skins, or sheet metal.

The present invention is directed to improvements in internally braced structural wall panels composed of a core faced with sheet material on both sides. While panels, made in accordance with my invention, may be faced with plywood or sheet metal, they are preferably faced with plastic; hence, my invention will be hereinafter described largely in connection with plastic-faced panels.

The principal object of the present invention is to provide a novel and simple method for internally bracing a structural wall panel.

Another important object is to provide, for internally bracing a structural panel, a highly flexible and versatile method which makes it easy not only to provide an internal bracing design of one selected character but also to change from one such design to another selected design of appropriate character, such as one of desired "structural shape," i.e., a shape especially adapted to structural purposes, including, but not limited to, those shapes which are well known to give the greatest strength and economy with the least material.

Another important object is to accomplish the foregoing objectives in a method which can be easily and quickly performed by comparatively unskilled labor and which does not necessarily require special equipment for its performance.

Another important object of the present invention is to provide a method of making internally braced structural wall panels which can be easily and quickly fabricated in curved shapes of simple and compound types such as are represented by trough-like and cylinder-like structures on the one hand and tray or sink-like structures on the other.

Broadly speaking, my invention resides in the concept of internally bracing a structural wall panel with a suitable panel-like system of plastic ribs, which are produced by (a) arranging a suitable core material to provide a similar panel-like system of grooves (b) providing the grooves with a hardenable plastic filling of a desired structural type (i.e., a type which hardens into a unitary structurally strong mass), and (c) then hardening this plastic to form a unitary structurally strong panel-like system of ribs to the desired character or design. By the terms "structural panel," "structural wall panel," "internally reinforced wall panel" and "load bearing wall panel," I mean not only to designate panel-like wall structures in the form of flat panels composed of spaced flat planar facing sheets separated by a flat core which may be composed entirely or in part by a panel-like system of internally bracing plastic ribs but also to designate curved wall structures in the form of curved "panels" similarly composed of spaced curved facing sheets separated by a similarly curved "panel-like" core of ribs. By "panel" or "panel-like," I mean that either or both of the length and width dimensions of the facing sheets may be substantial but the thickness of the core space between them is of the relatively small order normally found in wall panels.

The manufacture of the ribs preferably is accomplished in situ, i.e. within the core space of the panel. But the manufacture of the ribs may also be easily and quickly accomplished outside the core space as by: (1) providing a suitable base; (2) covering that base with a satisfactory plastic-releasing agent; (3) providing a suitable core material in the form of rigid sections or blocks of a plastic foam, such as a rigid polystyrene foam, upon the plastic-releasing face of the base with the sections or blocks arranged in horizontally spaced relationship to provide a system of narrow grooves (corresponding to a predetermined system of ribs selected, by structural design considerations, for internal panel-bracing purposes); (4) providing the grooves with a desired filling of hardenable plastic of a desired structural type; and then (5) hardening this plastic to form the desired system of ribs.

Obviously the method of my invention provides a simple, inexpensive and very versatile way of forming internally bracing ribs to any of a wide variety of structural patterns as, for example, any of a variety of grid-like and truss-like patterns, or a honeycomb pattern, etc.

Figure 8:
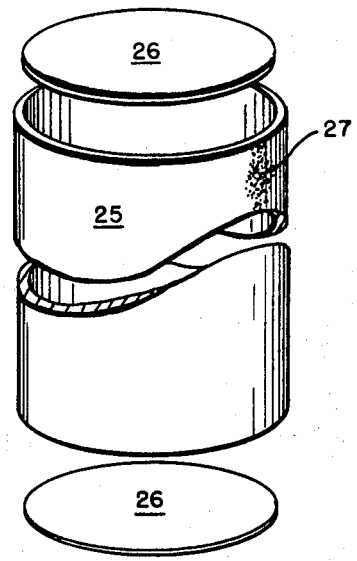
Figure 10:
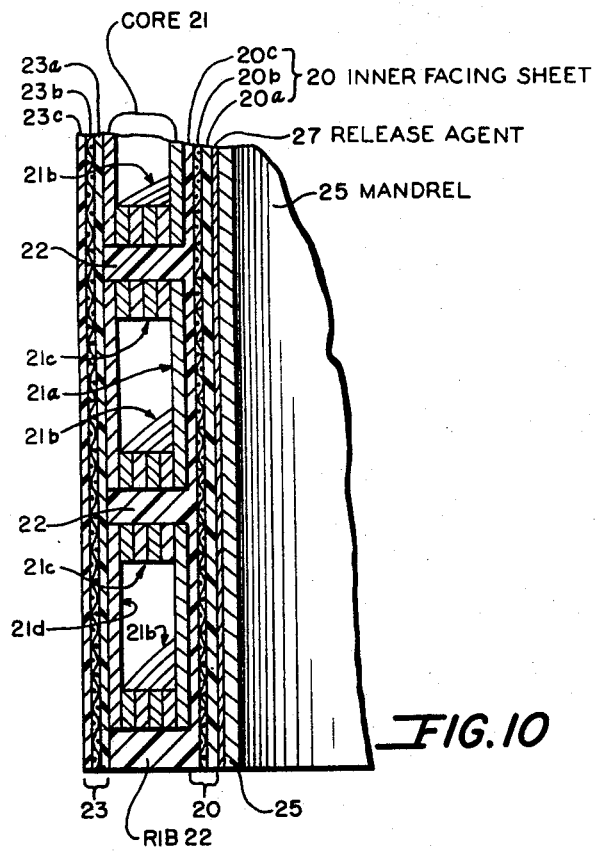
Figure 9:
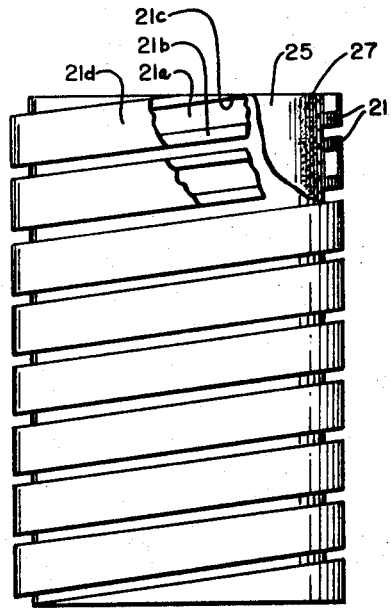

Various practices of the present invention are described in connection with the accompanying drawings wherein:

FIGS. 1–3 relate to a method of forming a grid in accordance with my invention, FIG. 1 being a perspective view of the product grid, FIG. 2 a perspective view of a plastic mold for use in forming said grid product, and FIG. 3 a fragmentary section of said mold with the grid product formed on it;

FIGS. 4–6 relate to a method of forming an integrated planar wall panel in accordance with my invention, FIG. 4 being a partly broken perspective of the planar wall panel, FIG. 5 a perspective view of a mold for the facing sheet of the integral panel, and FIG. 6 a perspective view of the partly formed panel as it appears when the core is ready to receive the rib-forming plastic;

FIGS. 7–10 relate to a method of making a structural wall panel, in the form of an open-ended cylinder, in accordance with the invention, FIG. 7 being a partly broken view of a cylindrical structural wall panel, FIG. 8 a partly broken view of a cylindrical mandrel used in the manufacture of the cylinder of FIG. 7, FIG. 9 a partly broken view of a partly formed cylindrical panel as it appears when the core is ready to receive the rib-forming plastic, and FIG. 10 an exaggerated sectional view of a fragmentary portion of the cylindrical panel as it appears on the mandrel when the outer facing sheet has been completed;

FIGS. 11–17 relate to a method of making a structural wall panel, in the form of a flanged-mouth tub, in accordance with my invention, FIGS. 11–12 being partly broken perspective views of a somewhat rectangular tapered-well tub formed in accordance with my invention, FIG. 13 a perspective view of a mold having its outer surface shaped in accordance with the inner surface of the tub, and FIGS. 14–17 being schematic views illustrating the steps involved in providing the tub with a core; and FIGS. 18 and 19 illustrate two designs of a multi-core form of structural wall panel made in accordance with my invention.

PLASTIC SYSTEMS

Plastics which are suitable for use in the present invention in making planar and curved internally reinforced structural panels comprise hardenable resinous materials. These hardenable resinous materials may be employed not only to provide a plastic rib system but one or more of the other components of the panel. Suitable hardenable resinous materials include:

I. Resins which react or cure to a final hard "infusible" condition either with or without the application of external heat; and II. Resinous materials, some of which soften or melt on heating and harden to a final hard "fusible" condition on cooling and others of which react to that condition.

The foreging group I includes the thermosetting resinous materials, such as, for example, epoxy and polyester resins. The epoxies are those of the heat-curing and cold-hardening types. The polyester resins include, for example, those produced by esterification of unsaturated polybasic organic acids with polyhydric alcohols, e.g., esters of maleic acid, allyl esters of dibasic acids, and copolymers of unsaturated esters with monomers such as styrene, all of which cure without application of heat or pressure, but are not limited thereto. The thermosetting resins also include: monomeric, low polymeric, and B-stage phenolic resins which are either liquid and cold-setting or which can be melted and hardened from a soft thermoplastic stage and cured with heat to an infusible cured stage, e.g., phenol-aldehyde or phenol-furfural resins; also polysulfide rubbers.

Group II includes: (A) the hot melt thermoplastic resinous materials which have relatively low melting or flow points and which may be (1) melted and poured or (2) forced in place with hot plates or platens, or (3) provided in the form of thermoplastic molding powders or pellets and made to flow when subjected to oven or radiant heat; and (B) the resinous plastisols or resinous organosols which comprise the finely divided or colloidally dispersed synthetic resins in plasticizers, which require heat to combine the resin and plasticizer into the final product. Examples of such hot melt thermoplastic resins include acrylic resins such as polymers or copolymers of acrylic acid, methacrylic acid, esters of these acids, e.g. methyl and ethyl esters and acrylonitrile. They also include hydrocarbon resins such as coumarone-indene, vinyl resins such as polyvinyl chloride, polyvinyl chloride-acetate, polystyrenes, polyurethanes, polyolefins such as polyethylene and polypropylene, polybutylene and hardenable silicones such as polymethyl siloxane.

Likewise resins from both groups may be mixed together in accordance with known practices. My invention may be practiced with materials, usually in liquid form, which, when mixed together, react to form either a thermoplastic or a thermosetting material. For example: the reaction product of furfural alcohol and an aldehyde may be reacted with an anhydride, such as phthalic anhydride (preferably under elevated temperature conditions), to produce a furan resin of Group I; while an appropriate mixture of divinyl benzene, alpha-methyl styrene and monomeric styrene react with heat to form polystyrene of Group II. The resinous materials used in the practice of this invention are normally substantially free of non-reactive solvents.

A designer, concenrned with an internally reinforced structural panel intended for a given use, knows at the outset what important properties (mechanical, chemical, electrical, etc.), that panel must possess in order to meet the requirements of its intended use. The extent to which the available thermosetting and thermoplastic resins and resinous plastisols possess these properties is also known. Consequently, once my concept of providing internally reinforced structural panel, is understood, the selection of resins and resinous mixtures should become largely a matter of choice.

With respect to core material, it should be understood that, in addition to foamed plastics, balsa wood and corrugated paper, my invention contemplates the use of a wide variety of other materials including magnesia blocks, silicate foam and composite cores composed of a binder mixed with some other material such as the material of an asphalt binder with a lightweight aggregate or a glue binder with particles of cork. My invention also contemplates the use of meltable cores, such as paraffin or gelatin, which are used only for the purpose of forming the grooves and which are melted and removed after the ribs have been formed and solidified in said grooves.

The fillers must not be soluble in the resinous materials used to form either the facing sheets or the ribs. If heat processing is involved, in producing any part of the structure, the fillers must not be adversely affected by that either. Fillers are used to impart specific mechanical, chemical and electrical properties to the plastic, to improve internal stability and to increase resistance to various service conditions. Some common fillers and their functions are as follows:

For bulk: wood flour, asbestos, marble flour, sawdust, mica, jute, hemp, ground cork, cotton flock, wood pulp, walnut-shell flour.

For reinforcement: wood flour, cotton fiber, glass fiber, hemp, asbestos, wood pulp.

For hardness: metallic carbides, metallic nitrides, silicon carbide, quartz, mica.

For heat, water or chemical resistance: asbestos, graphite, diatomaceous earth, quartz, sand, metallic oxides, powdered metals.

For appearance: metallic pigments, powdered metals, phosphorescent calcium sulfide, lithopone, metallic oxides, organic pigments.

EXAMPLE I.—PLANAR GRID-FORMING METHOD, FIGS. 1–3

FIG. 1 illustrates a panel-like system of plastic structural load-bearing ribs, comprising straight longitudinal ribs 1 and cross ribs 2, arranged in a pattern of selected character to form a panel-like grid having flat or planar top and bottom faces. The method used in producing a load-bearing grid of this general character comprises: A. providing a grooved mold composed of (1) a base having a planar face and (2) a core, on that planar face, said core having (a) a desired thickness from said planar face outwardly and (b) a system of grooves (1) extending depthwise from said base outwardly and (2) extending lengthwise not only parallel to said planar face but also in a pattern corresponding to said rib pattern; B. forming ribs in said mold by (1) providing the grooves with a hardenable plastic of a suitable structural type and (2) hardening that plastic to form the ribs.

Grooved mold

To provide a base- and core-forming mold, for use in practicing the foregoing method, I may employ a rectangular tray-like mold 4 having long side walls 5, shorter end walls 6, a planar base or bottom wall 7 and an open top. The length, width and thickness of said walls 5–7 are dimensioned to provide, within the confines of the tray, a panel-like space sufficient to accommodate the length, width and thickness of the grid. This tray space is divided, by horizontally spaced core blocks 8, into a system of grooves 9 which are arranged in a grid-like pattern corresponding to the pattern of the aforesaid longitudinal ribs 1 and cross ribs 2.

Mold release agents

The groove-forming walls of the mold 4, including core blocks 8, may be covered with a satisfactory releasing agent, say a 5 mil polyethylene film. Or, alternatively, the base 7 and core blocks 8 of the mold 4 may be formed as an integral unitary structure composed wholly of polyethylene, which is the arrangement illustrated. Furthermore, since the grid, when formed in the mold, is to be removed therefrom, the side walls of the grooves 9 preferably diverge slightly toward the upper open end of the mold. Consequently, the thickness of the ribs will range from any suitable bottom dimension, say 1/4 inch, to any suitable top dimension, say 5/16 or 9/32 of an inch. We assume the depth of the grooves to be 1″ but this, like all other dimensions, will vary in accordance with structural requirements.

Ribs

The grid-forming ribs desired may be formed by filling the grooves flush with the desired hardenable plastic which hardens into a unitary structurally strong mass. Among the better reaction-curing plastics for this purpose are: the liquid polyester resins; and the liquid epoxy resins. Since satisfactory resins of this character may be obtained from many different sources, it should suffice to say that, in carrying out this particular method, I have used a liquid epoxy resin consisting of 100 parts, by weight, of "Epi-Res #510" and 35 parts, by weight, of a reactant, "Epi-Cure #872," these being products of the Jones-Dabney Company in Louisville, Ky. An epoxy mixture of this character can be mixed, poured and allowed to react, all at room temperature, until the epoxy sets. When setting occurs, the grid may be removed from the mold whereupon it is ready for use.

Other molds and release agents

Other molds composed of any of a wide range of metals, plastics and other materials may be employed. In this event, other mold releasing agents may be necessary. If so, suitable mold-releasing agents may be selected from the following: (a) films of glassine paper, cellophane and vinyl films or films of polyvinyl alcohol or polyvinyl chloride-acetate; (b) film-formers including alginates, cellulose derivatives such as methyl cellulose and cellulose acetate and polyvinyl alcohol solutions; (c) waxes including carnauba and candelilla; and (d) lubricants including sulphate esters, graphite, lecithin, alkyl-phosphates, petroleum jelly and silicones.

Meltable cores

The core or core blocks 9 may be made of a "meltable" material, which, after the grooves are filled and hardened, can be removed by melting. Thus gelatin or wax may be used. Paraffin wax, if used, should have a melting point sufficiently high to be structurally stable during the curing process, yet low enough to melt and flow without damage to the resin (approximately 135° F.). These same properties are essential in the gelatin, and we have found that the commercial product used for "Hectograph" duplication is suitable.

Other ribs

The ribs may be composed of other resinous materials, particularly including the cold-setting phenolics, polysulphide rubbers, polyurethanes, silicones and polystyrenes. It will be understood that fiberglass may be incorporated in the resinous starting material (or the grooves may be provided with fiberglass) to reinforce the ribs. Other suitable rib-reinforcing materials may be used, including fibrous materials and fabrics. If desired, certain ribs, such as one or more of the longitudinal ribs, may be designed to have greater or smaller dimensions or amounts of reinforcing materials than certain other ribs, such as one or more of the cross ribs, to provide variations in strength as called for by the design.

As stated, grids of this type may be used over the openings of sidewalk and cellar window wells and as elevated walkways. In addition, they may be used as the core structure in hollow flush doors and in other structural wall panels for internal bracing purposes.

EXAMPLE II-A.—METHOD OF FORMING A FLEXIBLE WALL PANEL, FIGS. 4–6

FIG. 4 illustrates a flexible planar structural wall panel made in accordance with my invention. This flexible panel comprises: straight longitudinal ribs 11 and cross ribs 12 formed in the grooves of a core 13 to a pattern of selected character and interposed between planar bottom and top plastic facing sheets 14 and 15 to which the ribs are welded or otherwise suitably secured. The method used in producing a load-bearing panel of this general character comprises: (A) providing a first or bottom plastic facing sheet having a planar face; (B) providing, on that face, a core having a desired thickness and a desired system of grooves, as before; (C) providing the grooves with a hardenable plastic; (D) hardening the plastic in the grooves to form the ribs; (E) bonding the ribs to the bottom facing sheet; (F) providing a second or top plastic facing sheet over that filler and the ribs; and (G) bonding the ribs to the top facing sheet.

Bottom facing sheet

In practicing the foregoing method, I may either provide a prefabricated bottom plastic facing sheet or form the sheet on a base having a planar face. In this latter connection, as a base, I may employ a shallow rectangular tray-like mold 17, the bottom of which provides the desired planar face. The mold 17 corresponds to the mold 4 (without blocks 8) except that it is composed of aluminum and the thickness of its tray space approximates the desired thickness of the bottom plastic facing sheet which is assumed to be 3/16 of an inch. This mold 17 is filled with a thermoplastic resin such as polyethylene, polypropylene or polybutylene. For example, I have used molten polyethylene (Epolene C from Eastman Chemical Company) to form the first bottom or facing sheet 14. This sheet may also be formed by pouring the molten polyethylene on the planar face of a suitable base and using a doctor blade to draw it to a film of uniform thickness.

Core

The core 13 may be in the form of prefabricated rigid or yieldable blocks 13 of foamed plastics such as the rigid foams in one case and the yieldable foams in another of polystyrene foam, vinyl foam, polyurethane foam, etc. Thus I have used flexible (or yieldable), and somewhat resilient core blocks of isocyanate foam (preferably characterized by tiny cells) by placing them on the tacky polyethylene. These core blocks 13 are positioned in horizontally spaced relationship to form the desired pattern of grooves. The bottom facing sheet 14 may be maintained at a temperature sufficient to keep it in a tacky state, or it may be appropriately heated, in the event it cools to a non-tacky state before the positioning of the foam blocks is completed. The dimensions of the grooves may be the same as in the preceding grid-forming method or they may be otherwise dimensioned in accordance with the structural requirements of the panel. However, the grooves may be of uniform width since the sides of the ribs do not need to diverge in width in one direction or another.

The periphery of the grooved core formed by the core blocks 13 may now be taped to close the openings of the grooves along the perimeter of the core. A strip 18 of polyethylene or some other suitable material, having a width equal to the height of the grooves and a length great enough to encircle the periphery of the core may ordinarily be used for this purpose. If desired, this strip may extend upwardly beyond the top face of the core sufficiently to accommodate the thickness of the top plastic facing sheet.

Ribs

The ribs 11 and 12 are formed by filling the grooves with molten polyethylene and allowing the hot polyethylene to cool and harden. These ribs are bonded to the bottom facing sheet 14 preferably contemporaneously with the rib-forming operation simply by maintaining the bottom sheet at a temperature sufficient to keep it in a tacky state during the rib-forming operation. However, if desirable or necessary, the bonding operation can be performed later by reheating both the ribs and the bottom facing sheet to a bondable temperature. The ribs may be reinforced with fiberglass, etc., as in Example I.

Top facing sheet

After the ribs 11 and 12 have been formed, a prefabricated top facing sheet 15 may be placed over the ribs 11 and 12 and core 13 and bonded to the ribs in any suitable manner.

In place of a prefabricated top facing sheet 15, the top facing sheet may be formed contemporaneously with the formation of the ribs by overflowing the grooves with polyethylene to the extent necessary to build up a top facing sheet 15 of suitable thickness, say 3/16 of an inch. In this case, the flow of this material must be dammed at the periphery of the panel and this may be done by extending the peripheral tape 18 sufficiently upward.

Again, if desired, the formation of the top facing sheet 15 may be separated from the rib-forming operation by pouring a suitable molten plastic for the top sheet into a shallow mold 17 and then inverting the assembly (formed by the ribs 11 and 12, the core 13 and the bottom facing sheet 14) over the mold 17 and placing it upon the top sheet 15 in the mold while both the ribs and the top sheet remain in, or are reheated to, a bondable state.

While polybutylene, polyethylene and polypropylene facing sheets lack rigidity, they are substantially reinforced in this respect by the plastic ribs, particularly when the ribs are bonded to both facing sheets. Since such flexible panels can be readily made flat or curved and since said facing sheets can be heat-welded, panels of this type may be used to advantage in making rectangular or cylindrical tanks for storing corrosive and other liquids at normal temperatures.

Other facing sheets

For the facing sheets, a wide range of other resinous materials can be used including: among the thermoplastics, acrylics such as modified methyl methacrylate, halocarbon such as tetrafluoroethylene, polyamide, flexible silicones, styrene and vinyl; and among the thermosetting resins, flexible epoxies, polysulfide rubbers and flexible polyesters or polyurethane.

Where flexibility is emphasized, the polystyrene, polyurethane and vinyl foams used in making the core blocks 13, should be yieldably resilient.

Other ribs

In place of polyethylene ribs, other thermoplastic rib-forming resins may be employed including: among the thermoplastics, acrylic such as modified methyl methacrylate, halocarbon such as tetrafluoroethylene, polyamide, flexible silicones, styrene and vinyl; and, among the thermosetting resins, flexible epoxies, polysulfide rubbers and flexible polyesters or polyurethane.

EXAMPLE II–B.—METHOD OF FORMING A COLD STORAGE WALL PANEL, FIGS. 4–6

The method of Example II–A may be used in forming wall panels composed of other combinations of plastics to provide wall panels which are particularly suited for use at low temperatures.

Facing sheets

For example, the top and bottom facing sheets may be composed of a resinous plastisol and the ribs composed of polyester or epoxy resins. Thus, each facing sheet may be formed by pouring a resinous plastisol, consisting of 65% vinyl chloride (Geon 121 from B. F. Goodrich Company) and 35% dioctylphthalate, into molds 17 and oven curing them at 170° C. for 12 minutes.

Cores

Promptly after curing, prefabricated core block (composed of any suitable foam such as those mentioned in Example II–A) may be mounted on the bottom plastisol facing sheet to form 1/4" wide grooves at right angles to each other but arranged at an angle of 45° to 90° to the intersecting peripheral edge of the assembly.

Ribs

The open outer ends of the grooves may now be closed or dammed, filled flush with either a liquid polyester resin or a liquid epoxy resin (such as the epoxy mentioned in Example I) and then allowed to cure at room temperature. The resulting partially finished panel is thereupon inverted on the plastisol top sheet and the entire panel subjected to a curing temperature of 170° C. for 12 minutes.

If desired, the rib resin may be "filled" to render it extrudable and the ribs thereafter formed by extruding the filled resin into the grooves. With this procedure, the top plastisol facing sheet may be formed by spraying it over the core ribs and the core block to a suitable thickness, curing the whole panel in an oven at 170° C. for 12 minutes (which, however, would not do more than partially set the rib resin), and then permit the final curing of the rib resin to proceed normally at room temperature.

Resinous plastisols behave particularly well at low temperatures. Also since they have good heat insulating value and can be readily joined together, a structural wall panel of this character is particularly suited for refrigerator rooms. The fact that they can be colored and are easy to keep clean also makes them attractive for various purposes.

Other materials

The resin used for the facing sheets, core blocks and ribs may embrace not only the flexible forms of the resins specified in Example II–B but also the rigid forms thereof. However, since heat insulation is emphasized in this form of construction, the core blocks may be made of cork, balsa wood or other suitable heat-insulating materials. Also where the outer facing sheet is not to be subjected to cold temperatures, it need not necessarily be a resinous material which is characterized by good insulating and structural strength properties at low temperatures.

EXAMPLE III–A.—METHOD OF MAKING AN OPEN-ENDED CYLINDER, FIGS. 7–10

The open-ended cylinder illustrated in FIG. 7 comprises: an inner cylindrical facing sheet 20; a core 21 containing a selected pattern of curved internal-bracing ribs 22; and an outer cylindrical facing sheet 23. The method used in producing a cylinder of this general character comprises: (A) providing a first or inner cylindrical plastic facing sheet; (B) providing, on the outer periphery of that inner facing sheet, a cylindrical core having a desired radial thickness and a desired cylindrical system of grooves; (C) providing the grooves with a hardenable plastic; (D) hardening the plastic in the grooves to form ribs; and (E) providing a second or outer cylindrical plastic facing sheet over the cylindrical core.

Inner tubular facing sheet

In practicing the foregoing method, I may provide a prefabricated inner tubular (preferably cylindrical) facing sheet composed of a plastic which is selected for the lightweight, strength, corrosion resistance or one or more other properties it must have during its intended use as, for example, sewer pipe, vent pipe, supply pipe, etc. As a prefabricated sheet, it can be made from solvent-bearing or solvent-free resinous compositions so long as the ultimate facing sheet product has the physical properties required to withstand the temperature, pressure, corrosion and other conditions to which it may be subjected during use. Such prefabricated sheets might be made either: in the form of cylinders; or, in the form of planar sheets which can be heat-softened and wrapped or otherwise brought to a cylindrical shape. Thermoplastic resins suitable for many such uses include polyethylene, polypropylene and polybutylene.

In the absence of a prefabricated inner facing cylinder, I may provide a base having a cylindrical face of suitable length and diameter and form the inner facing cylinder thereon. While this may be done in various ways, it can be easily and inexpensively accomplished by using a paper cylinder or mandrel 25 of suitable axial length and diameter and providing it with means at either or both ends for mounting it on a shaft to enable its being rotated either manually or mechanically. Thus, the mandrel 25 shown in FIG. 8 is fitted with plywood ends 26.

The peripheral surface of this mandrel is initially covered with a releasing agent such as a 5 mil layer 27 of polyethylene either in the form of a unitary cylinder made by spraying the peripheral surface of the mandrel with hot polyethylene or in the form of a polyethylene sheet wrapped about the mandrel and suitably held in place.

The inner cylindrical facing sheet 20 may be suitably formed by sandwiching a reinforcing fabric between inner and outer sheet-like layers of plastic. The inner layer 20a may be formed by brush coating a liquid epoxy resin (which may be formulated as in Example I) upon the coated or covered releasing face of the mandrel to build up a relatively uniform thickness of about 10 to 20 mils. When this layer shows evidence of becoming tacky, it is covered by a layer of glass cloth 20b which preferably is fitted smoothly around the mandrel and then worked or manipulated in a manner causing the epoxy of the inner layer 20a to work its way into the glass cloth. The glass fabric 20b may now be coated with an outer layer 20c of liquid epoxy, which preferably is thick enough to seal the inner facing sheet 20 against the transmission of liquid or vapor. A 10 mil layer should be sufficient.

After the inner and outer epoxy layers of the inner facing sheet 20 have set sufficiently to hold the interposed glass cloth 20b firmly in place, a suitable groove-forming core 21 is applied.

Core

While any suitable form of core 21 may be used, I have obtained excellent results with wide bands and narrow strips of corrugated paper. For example, a single layer of corrugated paper, forming a 3" wide inner band 21a, was wrapped spirally around the inner face cylinder in a manner leaving a ¼" wide rib space between the spiral turns. Thereafter an intermediate strip 21b of corrugated paper ½" wide was spirally wound over the inner band 21a along one edge of the proposed groove. This intermediate strip 21b was bonded to the inner band 21a by a suitable bonding agent such as sodium silicate. Three additional intermediate strips 21b were required to be wound one upon the other in order to build up the side wall of the core 21 along one edge of the groove.

The opposite edge of the groove was built up in a like manner; hence, four like strips 21c were spirally wound one upon the other and bonded to each other. With this arrangement, there is an axial spacing of 3" between one edge of one spiral turn of the groove and the adjacent opposite edge of the next turn. Also, between spirally wound strips 21b and 21c, there is a spirally extending opening which is 2" wide.

The core may now be completed by wrapping an outer band 21d of 3" wide corrugated paper spirally between successive spiral turns of the groove so as to cover adjacent strips 21b and 21c and the 2" opening between them and, at the same time, complete the building up of the depth of the grooves to the 1" dimension desired. The spiral groove thus completed approximates ¼" in width and 1" in depth.

Ribs

While any of a number of rib resins may be employed, depending upon the properties desired in the final product, I again prefer ribs 22 composed of a polyester or an epoxy resin. To facilitate the filling of the grooves, I prefer the use of an extrudable thixotropic mixture, comprising the selected resin and a suitable filler. For example, good results can be obtained by using the same epoxy formulation mentioned in Example I, filling it with asbestos fibers and then extruding it into the grooves with a caulking gun or with some other suitable extrusion device. With a thixotropic epoxy, the extrusion operation can be continuously performed while slowly turning the cylindrical assembly formed by the mandrel 25, the inner facing sheet 20 and the corrugated paper core 21.

While a spiral rib is illustrated, it will be readily understood that circular ribs may be used. Furthermore, if desired, the spiral or circular ribs may be interconnected into a network by axially extending ribs. The use of the thixotropic rib resin not only prevents it from flowing out of the grooves but also prevents it from flowing axially into the core material.

After the completion of the rib extruding operation, the epoxy may be permitted to set at room temperature and thereby complete the formation of the ribs.

Outer facing sheet

Thereafter an outer facing sheet 23 is formed in a manner either similar (or identical) to that used in forming the inner facing sheet 20. In other words, the outer faces of the core 21 and ribs 22 are first coated with an inner layer 23a of resin, such as an epoxy, next covered with glass cloth 23b, which is manipulated to force some of the epoxy into the cloth, and then coated with a final outer layer 23c of resin to complete the outer facing sheet 23.

Product cylinder

A cylindrical pipe made in this way has many advantages. It is lightweight. It can be made in a large range of sizes limited only by practical considerations; hence, it is not limited in size as is extruded plastic pipe which can be extruded only in relatively small sizes and only over a small range, it being impractical to extrude the larger sizes.

Other facing sheets

In addition to the facing sheet resins specified in Example II–A, urea, melamine and other amino resins, phenolic resins, resins derived from furfural alcohol and furfural aldehyde and silicone resins may be employed.

Other cores

So long as a lightweight core is preferred, I may use any suitable cellular core, other than corrugated paper core, including the rigid and flexible resinous foams of the characters heretofore mentioned. But wood, asphalt and other like cores obviously may be used in sewer pipe, vent pipe and other pipe-type constructions in place of said corrugated paper core.

Other ribs

While I prefer to form the ribs of a cold-setting extrudable tough hard resin such as a polyester or an epoxy, other cold-setting resins including cold-setting phenolics and polyurethanes may be employed. I prefer those, like terpene and coumarone-indene, which become thin and highly fluid when heated. These can be filled and are readily handled when filled. I do not prefer resins, such as polystyrene, which, when heated, will not stay in place to form cylindrical ribs 22 unless they are filled and which, when filled, cannot be readily handled. However, the hot-curing thermosetting resins, such as furane and the hot-setting phenolics, may be employed.

EXAMPLE III–B.—METHOD OF FORMING A TUB WITH A FLANGED MOUTH, FIG. 11–17

FIGS. 11–12 are perspective views of a structural wall panel, in the form of a flanged-mouth tub made in accordance with the present invention, this tub includes: an inner facing sheet or shell 30 forming the well and the flanged-mouth of the tub; a core 31 having a selected pattern of ribs 32; and an outer facing sheet 33.

The method, used in the preferred practice of producing this flanged-mouth tub, comprises: (A) providing a plastic inner-facing shell, having bottom and side walls, conforming in shape to the shape of the bottom and side walls of the tub; (B–1) providing the outer faces of the bottom and side wall surfaces of said inner-facing shell (up to the bottom of the intended guttering) with a core having (1) a desired thickness and (2) a system of grooves (a) extending depthwise from said inner shell outwardly, and (b) extending lengthwise both substantially parallel to said outer shell surface and in a pattern corresponding to said desired rib pattern; (B–2) providing a grooved core for the guttering (a) by extending the grooved core, for the outer side wall of the tub, outwardly from the upper edge of that core and thence upwardly to a level slightly higher than the mouth of the tub and (b) by also extending this grooved core upwardly from the bottom of the guttering along the outer side wall of the tub, which also constitutes the inner side wall of the guttering; (C) providing a plastic outer facing sheet over the grooved core of the outer side of the tub below the guttering (and over the grooved core of the outer and inner sides of the guttering); (D) filling the rib forming grooves of the core between inner and outer sheets with a hardenable plastic of a structural type which hardens into a unitary structurally strong hard mass; and (E) hardening the rib plastic.

Inner-facing sheet

In practicing the foregoing method, I may provide a prefabricated tub-shaped plastic inner facing sheet or shell composed of a plastic selected for the properties it should have to satisfy the requirements of its intended use such as being light in weight, heat-insulating, imperviously smooth so as to be easily cleaned, and resistant to corrosion.

In the absence of a prefabricated tub-shaped inner-facing shell, I form the inner-facing sheet directly on a base in the form of a male mold presenting an outer surface, which conforms in shape to the desired shape of the inner surface of the tub. The shape of the male mold is so simple that it is not deemed necessary to illustrate it. It should suffice, therefore, to say that the side walls of the male mold incline outwardly from its horizontal bottom wall. For convenience, this mold is inverted to place its bottom surface uppermost where it is accessible. When inverted, the "top" surface of the mold and its outwardly declining side walls are coated with a releasing agent, such as an emulsified wax (Johnson's). Thereafter, the inner shell 30 is formed thereon by (a) covering the outer (top and side wall) surfaces of the inverted mold (down to the guttering) with a brush-applied gelled polyester resin (such as Polylite 8273 from Reichhold Chemical Co. containing a suitable catalyst, such as 1% methylethyl ketone peroxide), and a white pigment (10% titanium dioxide), which is used to improve the appearance of the inner surface of the ultimate tub products; (b) allowing it to set to a tacky condition; (c) covering it with a layer of glass cloth; (d) thoroughly impregnating the glass cloth with an additional quantity of said gelled polyester which can be applied by a brush and which need not be pigmented white or any other color; and (e) allowing this plastic inner shell 30 to set, after which it may be removed from the male mold.

Core

The outer surface of the inner shell 30, below but up to the guttering, is provided with a core 31 composed of prefabricated blocks 31a of rigid polystyrene foam (or flexible yieldable isocyanate foam) positioned in horizontally and vertically spaced relationship on the outer side wall and over the inverted outer bottom wall to form a suitable network of interconnected horizontal and vertical grooves approximately 1″ deep and ⅜″ wide. These core blocks 31a are secured to the plastic inner shell 30 either by pressing them thereon while the outer polyester coating remains in a tacky condition or by subsequently securing the blocks in place with a suitable bonding agent.

The core 31 for the guttering may be provided either before, during or after the provision of the core 31 for the main body portion of the tub. The steps involved in applying the body and guttering cores are schematically illustrated in FIGS. 14–17.

In FIG. 14, the inner shell 30 is shown with its outer (bottom and side wall) surfaces, below the guttering, provided with prefabricated blocks 31a positioned to form appropriate grooves running both horizontally and vertically. Preferably there are several horizontal successions of horizontally spaced side wall blocks 31a, each succession being vertically spaced from each adjacent succession.

As seen in FIGS. 15–17, the cores (for the bottom wall and the outer and inner side walls of the guttering) are provided by three horizontal successions of horizontally spaced core blocks 31b, 31c and 31d respectively. The core blocks in these gutter forming successions correspond to each other (and to the uppermost horizontal succession of the side wall core blocks 31a) in number and in horizontal dimension. This is done to facilitate the formation of straight vertical grooves.

As shown in FIG. 15, the core 31, for the bottom of the guttering, is provided by bonding one end of each prefabricated block 31b to the inner shell 30 so that each block extends horizontally outward from the inner shell at a point spaced above the upper end of the corresponding body core block 31a, a distance sufficient to form a horizontal groove of desired vertical thickness. For groove-forming purposes, the bottom margin of each block 31b, along its outer end, may be and preferably is cut away as indicated at 31e. This may be done before the block 31a is mounted in the position illustrated in FIG. 15. It will be understood that the succession of horizontal bottom core blocks 31b extends around the tub from one side of a drain at one end to the other side of that drain. The level of the bottom core blocks 31b preferably declines in a progressive manner toward the end drain and that, at the drain, it continues in a U-shaped path to form the legs and bight of the U. After the core blocks 31b have become firmly bonded to the inner shell 30, the core blocks 31c for the outer side wall of the guttering may be secured in place.

As shown in FIG. 16, each vertically arranged core block 31c is suitably secured at its lower end to the outer end of the corresponding block 31b. I have adhesively bonded them with a gelled polyester resin, the parts being pinned to hold them together while the polyester sets. Each vertical guttering block 31c is cut away along its upper end margin on its outer side so as to form another horizontal groove 31f. Preferably, the upper ends, of the outer vertical guttering blocks 31c, extend above the upper end of the inner shell structure sufficiently to prevent liquid in the guttering from spilling over the outer edge of the gutter. The succession of vertical outer core blocks 31c is an endless one completely encircling the tub. At the drain, its vertical dimension is increased downwardly to form the core for the outer end face of the drain.

As seen in FIG. 17, the guttering core is completed by bonding an endless horizontal succession of vertical core blocks 31d to the upper end portion of the outer side wall of the inner shell 30. This may be done in the same way as the blocks 31a are bonded to the inner shell 30 below the guttering. At the drain, the vertical dimension of this succession is increased downwardly to form the core for the inner end face of the drain.

Outer facing sheet

As is best seen in FIG. 17, the core 31 is covered with an outer facing sheet 33 composed of a tub-shaped outer shell 33a extending over the bottom and outer side wall surfaces not only of the body of the tub but also of the guttering and a gutter-shaped facing member 33b extending cross-sectionally from the upper edge of the inner facing sheet 30 to the upper edge of the outer facing sheet 33 and conforming to the shape of the guttering between sheets.

The outer shell 33a is formed by (a) covering the corresponding portion of the core 31 with a glass cloth which is thoroughly impregnated with a liquid epoxy resin (of the Example I formulation), (b) brush-coating the outer surface of the cloth with additional liquid epoxy if additional resin is required to make the outer shell liquid tight, and (c) allowing the outer shell 33a to set.

The gutter-shaped facing member 33b is formed in an identical manner. This member should join along its inner margin with the upper edge of the inner facing sheet 30 so as to close the groove openings along that edge. Its outer margin should join with the upper edge of the outer shell 33a so as to close corresponding upper edge openings of the grooves between blocks 31c. It will, of course, be understood that the inner facing sheet 30 and the outer facing sheet 33 provide smooth impervious surfaces.

Ribs

The tub is finished by filling the rib-forming grooves with a liquid epoxy (65% epoxy such as Epi-Res #510 and 35% polyamid such as Epi-Cure #855) and allowing the rib resin to set. Here, Epi-Cure 855 is used as the co-reactant instead of the Epi-Cure 872 used elsewhere, because of its lower exotherm and because the resulting resinous system has a much slower setting and gelation time.

In forming the outer facing sheet 33 and the ribs 32, better practice dictates that the gutter-shaped facing member 33b should be formed first, the structure then inverted, next the upper end portion of the outer shell 33a is formed over core blocks 31c, 31b and part of 31a, and finally the corresponding portion of the ribs 32 poured. When this is done, the rib-forming resin will readily flow down the vertical grooves and into the horizontal grooves and keep flowing until those grooves are completely filled. In this connection, the grooves 31e and 31f in core blocks 31b and 31c, respectively, are preferably made wider than the other grooves, as can be most readily appreciated in FIG. 13. This is done to provide increased strength in the ribs 32a and 32b of the overhanging gutter structure. After the mouth end portion of the tub is thus substantially completed, the remainder of the outer facing sheet 33a and of the ribs 32 can be completed in one or more steps.

In order to improve the appearance of the tub, the outer face of the outer shell is finally sanded smooth and then given a decorative finish coat of pigmented epoxy. This tub, when made to dimensions, which are substantially equivalent to 48" long x 25" wide x 26" deep, weighed only 125 lbs. Yet, when filled, it held in excess of 1500 lbs. of saline solution without any sign of sagging or deformation.

The tub was designed for the purpose of keeping a burned patient submerged in a tub of warm sterile saline solution while the contents of the tub are vigorously agitated and continuously circulated through filters and sterilizers. Because of this use, it was desirable to have a tub which was light in weight, heat-insulating, easy to clean and resistant to corrosion and which had an overflow trough for the recirculation and filtering and other processing required to remove skin and tissue from the bath and to resterilize and reheat the solution.

EXAMPLE IV.—MULTICORE LAYER PANEL

FIGS. 18–19 illustrate another form of structural wall panel made in accordance with my invention. This panel comprises: a bottom facing sheet 40 composed of an epoxy resin impregnated glass fabric; a first lightweight heat-insulating core layer of balsa wood blocks 41 bonded to the bottom facing sheet 40 in horizontally spaced relationship to form one network of grooves and a corresponding system of ribs 42 composed of liquid epoxy resin (of the Example I formulation but additionally containing 20% by weight of phenolic beads); a second core layer of balsa wood blocks 44 bonded on the first layer of core 41 and ribs 42 (or on a facing sheet 43 interposed between first and second core layers) and arranged in horizontally spaced relationship to form a second network of grooves and a corresponding system of ribs 45 composed of the same beaded liquid epoxy resin; and a top facing sheet 46.

The bottom and top facing sheets (and the interposed sheet, if used), may be and preferably, but not necessarily, are identically constructed. The balsa wood core blocks of both layers are preferably 1" thick and spaced to form ¼" grooves. Preferably, but not necessarily, the core blocks and ribs of one layer are offset from the core blocks and ribs of the other layer in both horizontal directions. However, any other arrangement may be employed. The phenolic resin beads used in the ribs are sold as "Microballons BJO" by the Bakelite Co.

This example illustrates the concept of using two or more core layers in a single structure. While these core layers may all be identically constructed, my invention includes the concept of making them nonidentical in order to meet design requirements and improve certain characteristics. Thus, the offsetting of the blocks and ribs of the one layer, in relation to the other layer, increases the heat insulating value of the core without affecting the internal spacing and other structural properties of the ribs.

My invention also includes the concept of providing one system of ribs to resist stress in one direction say parallel to the major plane of the finished panel and another system of ribs to resist stress from a different direction.

Having described my invention, I claim:
1. A method of making a load-bearing panel-like structure characterized by a system of firm solid resinous ribs arranged in a pattern of selected character, comprising:
   (A) providing a base, having an exposed major supporting face shaped in accordance with the desired shape of one major face of said panel-like structure;
   (B) providing, on said exposed face, a core
      (1) having a desired thickness from said exposed face outwardly, and (2) containing a system of rib-defining grooves
  (a) having a desired width,
  (b) extending depthwise substantially from said base outwardly, and
  (c) extending lengthwise both parallel to said major face and in a pattern corresponding to a rib pattern of selected character;
(C) flowing into said rib-defining grooves a filling of a flowable plastic resinous material of a type hardenable into a unitary structurally-strong firm solid mass; and
(D) hardening said hardenable resinous material in said grooves to form said selected pattern of firm solid ribs.

2. The method of claim 1 including:
(A) in performing the base-providing step, providing a bottom facing sheet having said exposed face;
(B) in performing the core-providing step,
  (1) making said core thickness at least equal to the desired rib thickness, and
  (2) making said core grooves extend depthwise outwardly through the full thickness of the core;
(C) in performing the flowing step, filling said grooves to the depth required to produce said rib thickness; and
(D) bonding said ribs integrally to said bottom facing sheet during the hardening step.

3. The method of claim 2 including:
(A) in performing the core-providing step,
  (1) making said core thickness approximate the desired rib thickness, and
  (2) making said core grooves interconnect with each other; and
(B) in performing the flowing step, completely filling said grooves.

4. The method of claim 2 wherein:
(A) in performing the base-providing step, providing a bottom facing sheet composed of a hardenable resinous material; and
(B) in performing the hardening step, said bottom facing sheet is hardened.

5. The method of claim 4 including:
(A) providing, over said core and said rib forming material, another facing sheet composed of a hardenable resinous material, and bonding it to said ribs.

6. The method of claim 2 wherein:
(A) in performing said core providing step, providing a core composed of a foamed resin.

7. The method of claim 2 wherein:
(A) in performing said core providing step, providing a foamed resin of the yieldable type.

8. The method of claim 2 wherein:
(A) in performing said core providing step, providing prefabricated core blocks which are composed of a foamed resin and spaced to provide said system of grooves.

9. A method of making a cylindrical structure having a panel-like wall which is internally reinforced by a selected pattern of ribs of desired thickness, comprising:
(A) providing an inner cylindrical facing sheet;
(B) providing, on said inner cylindrical facing sheet, a core
  (1) having, from said facing sheet outwardly, a thickness approximating the desired rib thickness, and
  (2) containing a system of rib-defining grooves
    (a) extending depthwise from said inner facing sheet outwardly through the full thickness of said core, and
    (b) extending lengthwise both substantially parallel to said inner facing sheet and in a pattern corresponding to the selected rib pattern;
(C) flowing into said rib-defining grooves and filling them with a flowable plastic resinous material of a type hardenable into a unitary structurally strong firm solid mass; and
(D) hardening said hardenable resinous material in said grooves to form said selected pattern of firm solid ribs.

10. The method of claim 9 including:
(A) providing, over said core and said ribs, an outer cylindrical facing sheet composed of a hardenable resinous material, which bonds to said ribs.

11. The method of claim 10 wherein:
(A) performing at least one of said facing sheet providing steps by applying, to an inner surface which is to underlie it, a resinous material which sets to a tacky condition;
(B) allowing the resinous material to set to said tacky condition;
(C) covering the tacky material with a layer of porous fabric; and
(D) thoroughly impregnating the porous fabric with a hardenable resinous material.

12. A method of making a tub-shaped structure having a panel-like wall which is internally reinforced by a selected pattern of interconnected ribs, comprising:
(A) providing a tub-shaped inner shell composed of a hardenable resinous material;
(B) providing the outer surface of said inner shell with a core composed of prefabricated blocks of resinous foam positioned in horizontally and vertically spaced relationship to form a suitable network of interconnected horizontal and vertical grooves extending in a pattern corresponding to the selected pattern of interconnected ribs;
(C) covering the core and its grooves with a porous fabric impregnated with a hardenable resinous material; and
(D) flowing into said grooves and filling them with a flowable plastic hardenable resinous material to form said pattern of interconnected ribs.

References Cited

UNITED STATES PATENTS

| | | | |
|---|---|---|---|
| 2,744,042 | 5/1956 | Pace | 156—79 XR |
| 3,139,369 | 6/1964 | Sullivan et al. | 156—503 |
| 3,176,618 | 4/1965 | Forsberg et al. | 156—197 XR |
| 3,211,601 | 10/1965 | Wand et al. | 156—257 |
| 3,232,017 | 2/1966 | Prusinski et al. | 52—309 |
| 2,493,032 | 1/1950 | Rheinfrank | 161—69 |
| 3,106,503 | 10/1963 | Randall et al. | 156—290 |
| 3,235,441 | 2/1966 | George et al. | 161—161 |
| 3,249,659 | 5/1966 | Voelker | 161—69 X |

EARL M. BERGERT, *Primary Examiner.*

M. L. KATZ, *Assistant Examiner.*